United States Patent
Guo et al.

(10) Patent No.: US 12,306,621 B2
(45) Date of Patent: May 20, 2025

(54) LOG INFORMATION OBTAINING SYSTEM AND METHOD

(71) Applicant: Shenzhen Fulian Fugui Precision Industry Co., Ltd., Shenzhen (CN)

(72) Inventors: Li-Wen Guo, Shenzhen (CN); Wen-Xiao Lu, Shenzhen (CN); Zhi-Yu Deng, Shenzhen (CN)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 216 days.

(21) Appl. No.: 18/111,721

(22) Filed: Feb. 20, 2023

(65) Prior Publication Data

US 2023/0350400 A1 Nov. 2, 2023

(30) Foreign Application Priority Data

Apr. 27, 2022 (CN) .......................... 202210458805.5

(51) Int. Cl.
*G05B 23/02* (2006.01)

(52) U.S. Cl.
CPC ...... *G05B 23/0264* (2013.01); *G05B 2223/06* (2018.08)

(58) Field of Classification Search
CPC .. G06F 11/34; G06F 11/3476; G05B 23/0264
See application file for complete search history.

(56) References Cited

U.S. PATENT DOCUMENTS

| | | | | |
|---|---|---|---|---|
| 2015/0311952 | A1* | 10/2015 | Varma | H04B 5/20 455/41.1 |
| 2020/0145279 | A1* | 5/2020 | Ono | H04L 49/25 |
| 2020/0167249 | A1* | 5/2020 | Yamana | G06F 11/2048 |
| 2020/0305300 | A1* | 9/2020 | Lin | G06F 11/0793 |
| 2023/0216607 | A1* | 7/2023 | Ladkani | H04L 1/0036 714/752 |

FOREIGN PATENT DOCUMENTS

| CN | 110704288 A | | 1/2020 |
|---|---|---|---|
| CN | 112667428 A | * | 4/2021 |
| TW | 201514693 A | | 4/2015 |

\* cited by examiner

*Primary Examiner* — Vincent H Tran
(74) *Attorney, Agent, or Firm* — ScienBiziP, P.C.

(57) ABSTRACT

The present disclosure provides a log information obtaining system and method. The log information obtaining system includes a baseboard management controller (BMC), a storage device, a first interface, a controller and a first selector. The storage device stores log information of the electronic device. The controller obtains a first signal of the BMC and determines the working state of the BMC, the controller outputs a first selection signal when the working state of the BMC is abnormal. The first selector selects the first output terminal to output the log information received from the first input terminal to the external device. Even if the BMC cannot work normally, it can still obtain the log information of the electronic device and debug the electronic device.

14 Claims, 5 Drawing Sheets

LOG INFORMATION OBTAINING SYSTEM AND METHOD

FIELD

The present disclosure relates to the field of server technology, in particular to a log information obtaining system and method.

BACKGROUND

When the server works abnormally, the log information in the server needs to be debugged, and the baseboard management controller (BMC) can collect the log information of the server. The technician establishes the physical connection between the external device and the baseboard management controller to obtain the log information from the BMC. However, when the BMC is abnormal, the log information of the server cannot be obtained.

Therefore, improvement is desired.

DETAILED DESCRIPTION

In the embodiment of the present disclosure, words such as "first" and "second" are only used to distinguish different objects and cannot be understood as indicating or implying relative importance or indicating or implying order. For example, the first application, the second application, and the like are used to distinguish different applications, not to describe the specific order of applications. The features defined as "first" and "second" can explicitly or implicitly include one or more of these features.

In the description of the embodiments of the present disclosure, the words "exemplary" or "for example" are used as examples, examples or descriptions. Any embodiment or design scheme described as "exemplary" or "for example" in the embodiments of the present disclosure shall not be interpreted as more preferred or advantageous than other embodiments or designs. Specifically, the use of words such as "exemplary" or "for example" is intended to present relevant concepts in a specific way.

The embodiment of the present disclosure provides a log information obtaining system. The motherboard protection circuit can be applied to electronic devices such as servers and computers.

Figure 1:
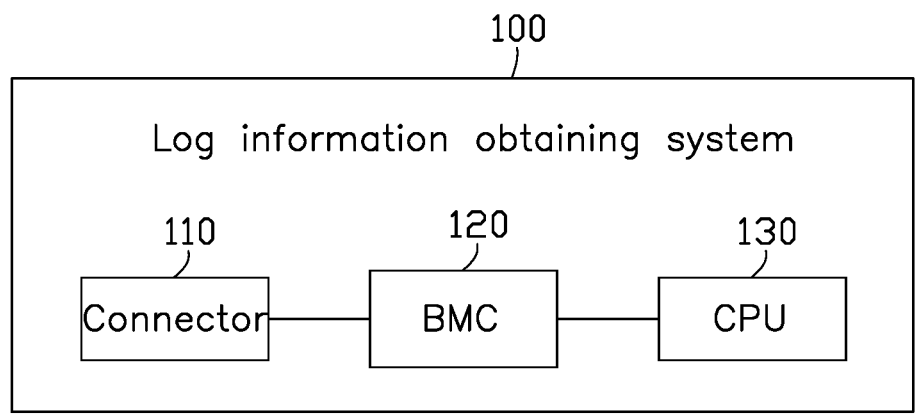
FIG. 1 is a schematic diagram of a log information obtaining system according to an embodiment of the present disclosure.

FIG. 1 illustrates a log information obtaining system 100 in accordance with an embodiment of the present disclosure.

The log information obtaining system 100 includes a connector 110, a baseboard management controller (BMC) 120, and a central processing unit (CPU) 130.

The BMC 120 includes a universal asynchronous transceiver (not shown in the figure). The BMC 120 is electrically connected to the CPU 130 through the universal asynchronous transceiver.

The CPU 130 stores the log information of the electronic devices (such as error reports, system logs). The connector 110 is electrically connected between the universal asynchronous transceiver of the BMC 120 and an external device (not shown in the figure). The connector 110 can be a data line, and the external device can be a computer.

In the embodiment, the electronic device converts the log information into universal asynchronous receiver/transmitter (UART) signal and reads and debugs the log information through UART signal. The BMC 120 obtains the UART signal from the CPU 130 through the universal asynchronous transceiver. The connector 110 is electrically connected between the external device and the universal asynchronous transceiver. The external device reads the UART signal through the 110. If the BMC 120 cannot work normally, it is difficult to obtain the UART signal, and then the log information cannot be obtained, and the electronic device cannot be debugged.

The embodiment of the present disclosure further provides a log information obtaining system, which can solve the problem that the log information of the electronic device cannot be obtained because the BMC cannot work normally, even if the BMC cannot work normally, it can still obtain the log information of the electronic device and debug the electronic device.

The following is an example of an electronic device as a server.

Figure 2:
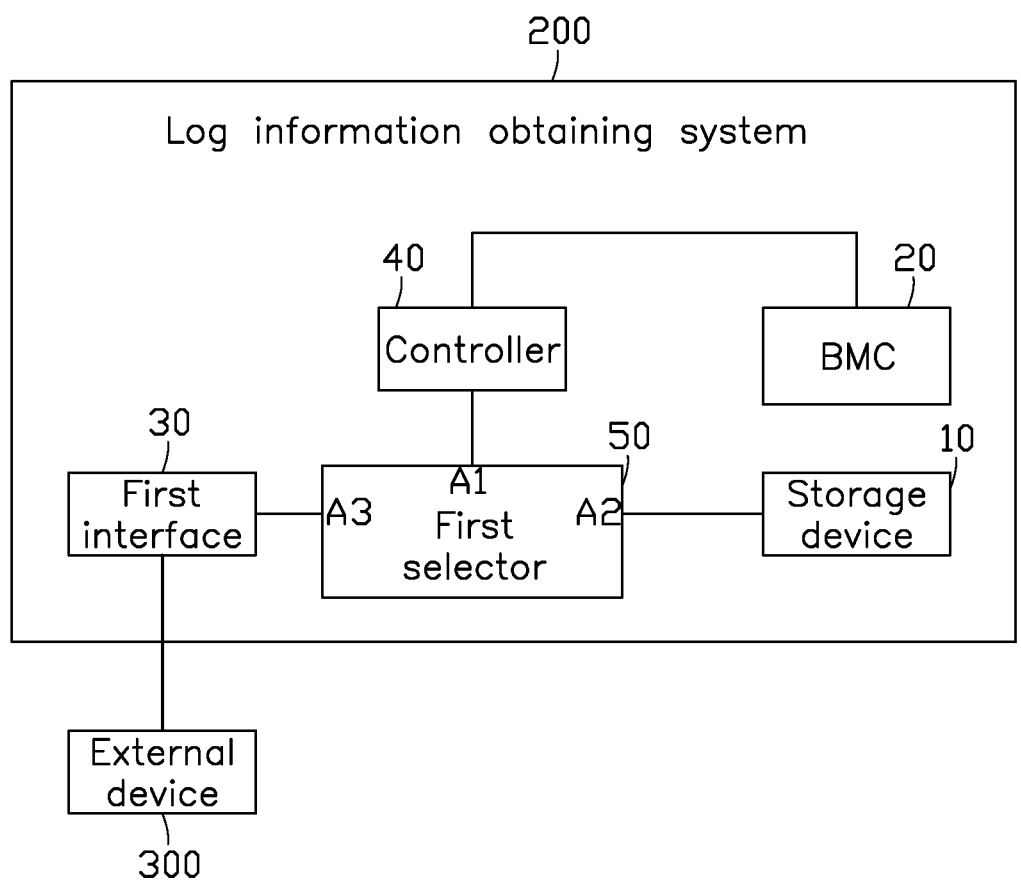
FIG. 2 is a schematic diagram of a log information obtaining system according to another embodiment of the present disclosure.

FIG. 2 illustrates a log information obtaining system 200 in accordance with an embodiment of the present disclosure.

As shown in FIG. 2, in the embodiment, the log information obtaining system 200 includes a storage device 10, a BMC 20, a first surface 30, a controller 40, and a first selector 50.

The storage device 10 stores the log information of the server. The first interface 30 is used to electrically connect an external device 300 so that the external device 300 can collect the log information of the server through the first interface 30. The controller 40 is used to obtain the first signal of the BMC 20 and determine the working state of the BMC 20 according to the first signal. When the working state of the BMC is abnormal, the BMC outputs a first selection signal.

The first selector 50 includes a first selection terminal A1, a first input terminal A2 and a first output terminal A3. The first selection terminal A1 is electrically connected to the controller 40, the first input terminal A2 is used to receive the log information transmitted by the storage device 10, and the first output terminal A3 is electrically connected to the first interface 30. The first selector 50 is used to select the first output terminal A3 to output the log information received from the first input terminal A2 according to the first selection signal. In other words, when the working state of the BMC is abnormal, the first output terminal A3 transmits the log information received from the first input terminal A2 to the first interface 30.

In the embodiment, the controller 40 detects the working state of the BMC 20, when the controller 40 determines that the working state of the BMC 20 is abnormal, the first selector 50 directly outputs the log information in the storage device 10 received by the first input terminal A2 to the first interface 30, thereby solving the problem that the BMC 20 cannot obtain the log information of the electronic device because it cannot work normally, even if the BMC 20 cannot work normally, it can still obtain the log information of the electronic device and debug the electronic device.

In the embodiment, the storage device 10 can be implemented as a central processing unit (CPU) of the server. In another embodiment, the storage device 10 can be implemented as a basic input output system (BIOS). It can be understood that the storage device 10 in the embodiment of the present disclosure can be implemented as a hardware or a combination of software and hardware that can store and record the log information of the electronic device.

In the embodiment, the log information in the server (such as system log) can be recorded and printed by the CPU. For example, the CPU can record the system log information in the BIOS. In another embodiment, the log information in the server (such as system log) can be recorded and printed by the BIOS, it records the entire operation process from the start of the server to the end of the server, including the initialization process of the memory and the CPU.

Figure 3:
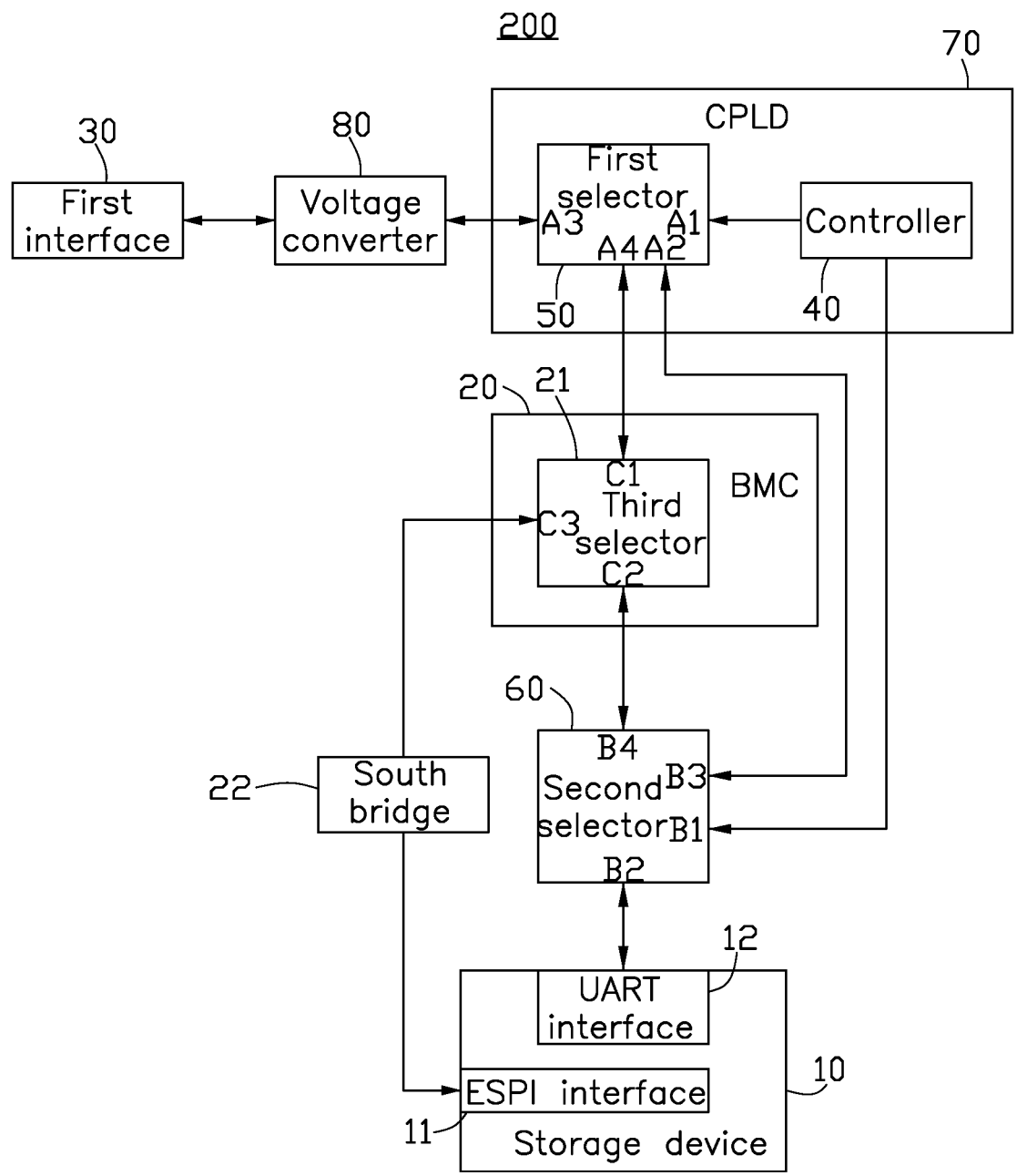
FIG. 3 is a schematic diagram of a log information obtaining system according to another embodiment of the present disclosure.

As shown in FIG. 3, taking the storage device 10 as an example, the CPU includes two interfaces related to the log information, namely, enhanced serial peripheral interface (the ESPI interface 11 in FIG. 3) and universal asynchronous transceiver transmission interface (the UART interface 12 in FIG. 3). It is understandable that the server transmits system logs through the ESPI interface 11 by default. In some embodiments, the UART interface 12 can be used to output the system log.

In the embodiment, the BMC 20 is used to monitor the internal management platform events (for example, the CPU temperature exceeds the limit, the CPU voltage exceeds the limit, the fan failure of the electronic device and other events) of the electronic device and record the events (such as the log information) in the system time log. In some embodiments, the BMC 20 can be an AST2150 chip.

In the embodiment, the controller 40 can be used to determine the working state of the BMC 20 according to the first signal. The first selection signal is output when the BMC 20 is determined to be abnormal, and the second selection signal is output when the BMC 20 is determined to be normal. The first signal can be one or more of the BMC_HB_LED signal and the BMC_READYOUT signal. In some embodiments, the controller 40 can store corresponding software programs for determining the working state of the BMC 20 according to the first signal.

The BMC_HB_LED signal is used to indicate the state of the heart beat LED of the BMC 20, for the operation state of the BMC 20, the technician can view the operation state of the BMC 20 through the heart beat LED of the BMC 20. When the controller 40 detects the BMC_HB_LED signal is abnormal, the controller 40 determines that the working state of the BMC20 is abnormal. When the controller 40 detects that the BMC_HB_LED signal is normal, the controller 40 determines that the working state of the BMC 20 is normal. When the controller 40 detects that the BMC_HB_LED signal is abnormal, the controller 40 determines that the working state of the BMC 20 is abnormal.

The BMC_READYOUT signal is the internal signal of the BMC 20, which is used to indicate that the BMC 20 is ready and can work normally. When the controller 40 detects that the BMC_READYOUT signal is invalid, the controller 40 determines that the working state of the BMC 20 is abnormal. When the controller 40 detects that the BMC_READYOUT signal is valid, the controller 40 determines that the working state of the BMC 20 is normal.

It is understandable that the controller determines that the working state of the BMC 20 is the existing mature technology according to the BMC_HB_LED signal, and the controller determines that the working state of the BMC 20 is the existing mature technology according to the BMC_READYOUT signal, which will not be repeated here.

In the embodiment, when the controller 40 detects that the BMC_HB_LED signal is normal and the BMC_READYOUT signal is valid, the controller 40 determines that the working state of the BMC 20 is normal, otherwise it is abnormal, for example, when the controller 40 detects that the BMC_HB_LED signal is abnormal and/or the BMC_READYOUT signal is invalid, the controller 40 determines that the working state of the BMC 20 is abnormal.

When the controller 40 determines that the working state of the BMC 20 is abnormal, the controller 40 outputs the first selection signal. When the controller 40 determines that the working state of the BMC 20 is normal, the controller 40 outputs the second selection signal.

In the embodiment, the first selector 50 further includes a second input terminal A4, the second input terminal A4 is electrically connected to the BMC 20. The first selector 50 is used to select the first output terminal A3 to output the log information received from the first input terminal A2 according to the first selection signal. The first selector 50 is further used to select the first output terminal A3 to output the log information received from the second input terminal A4 according to the second selection signal. The first output terminal A3 transmits the log information received from the second input terminal A4 to the first interface 30.

In some embodiments, the log information obtaining system 200 further includes a second selector 60. Referring to FIG. 3, the second selector 60 includes the first terminal B1, the second terminal B2, the third terminal B3 and the fourth terminal B4. The first terminal B1 is electrically connected to the controller 40, the second terminal B2 is electrically connected to the storage device 10, and the third terminal B3 is electrically connected to the first input terminal A2. The first terminal B1 is used as the selection signal input of the multiplexer, the second terminal B2 is used as the input terminal of the multiplexer, and the third terminal B3 and the fourth terminal B4 are used as the output terminal of the multiplexer. The third terminal B3 is electrically connected to the first input terminal A2 of the first selector 50, and the fourth terminal B4 is electrically connected to the BMC 20. In some embodiments, the second terminal B2 is electrically connected to the UART interface 12 of the CPU, the CPU transmits the log information to the second terminal B2 in the form of universal asynchronous transceiver transmission signal through the UART interface 12.

In some embodiments, the BMC 20 is electrically connected to the storage device 10 for obtaining the log information. The BMC 20 includes a third selector 21. The third selector 21 includes a first port C1, a second port C2 and a third port C3. The first port C1 is electrically connected to the second input terminal A4, the second port C2 is electrically connected to the fourth terminal B4, and the third port C3 is electrically connected to the ESPI interface 11 of the CPU. In some embodiments, the third port C3 of the BMC 20 is electrically connected to the ESPI interface 11 of the CPU through the south bridge 22.

In the embodiment, the third selector 21 further includes a selection signal input terminal (not shown in the figure) that receives the selection signal. The BMC 20 controls the third selector 21 to select the first port C1 to output the log information received by the second port C2 or select the first port C1 to output the log information received by the third port C3.

In the embodiment, the first selector 50, the second selector 60, and the third selector 21 may be multiplexers.

In the embodiment, the server converts the log information into universal asynchronous transceiver transmission signals and realizes the reading and debugging of the log information through universal asynchronous transceiver transmission signals. The bidirectional arrow shown in FIG. 3 indicates the transmission of universal asynchronous transceiver transmission signals.

In some embodiments, the controller 40 and the first selector 50 are arranged on the complex programmable logic device (CPLD) 70.

The first interface 30 is used to transmit the received log information to the external device 300, the external device 300 is used to collect the log information of the electronic device. In some embodiments, the first interface 30 may be the RJ45 interface or the universal serial bus (USB) interface.

In the embodiment, the first interface 30 set in the present disclosure is an external UART interface, an external interface for transmitting universal asynchronous transceiver transmission signals. The present disclosure does not need to open the case again during commissioning to avoid man-made damage to other devices on the PCA board.

In some embodiments, the log information obtaining system 200 further includes a conversion circuit that converts the received universal asynchronous transceiver transmission signal into a signal that can be transmitted through the RJ45 interface or the universal serial bus interface.

In some embodiments, the log information obtaining system 200 further includes a voltage converter 80. The voltage converter 80 is electrically connected between the first interface 30 and the first output terminal A3, and the voltage converter 80 may be a voltage conversion chip. When the voltage of the first interface 30 is inconsistent with the voltage of the universal asynchronous transceiver transmission signal, the voltage conversion can be carried out through the level converter 80 to avoid damaging the server motherboard or the BMC due to different voltages.

The working principle of the embodiment of the present disclosure is described in detail below:

The controller 40 detects the first signal of the BMC 20 and determines the working state of the BMC 20 according to the first signal. If the controller 40 determines that the working state of BMC 20 is abnormal, the controller 40 outputs the first selection signal to the first selector 50 and the second selector 60. The second selector 60 selects the third terminal B3 to output the log information received by the second end B2 according to the first selection signal, and the third terminal B3 transmits the received log information to the first input terminal A2 of the first selector 50. The first selector 50 selects the first output terminal A3 to output the log information received by the first input terminal A2 according to the first selection signal, and the first output terminal A3 transmits the received log information to the first interface 30 through the voltage converter 80.

If the controller 40 determines that the working state of BMC 20 is normal, the controller 40 outputs the second selection signal to the first selector 50 and the second selector 60. The second selector 60 selects the fourth terminal B4 to output the log information received by the second terminal B2 according to the second selection signal, and the fourth terminal B4 transmits the received log information to the second port C2 of the third selector 21. The BMC 20 can control the third selector 21 according to its internal logic, the third selector 21 selects the first port C1 to output the log information received by the second port C2 or the third selector 21 selects the first port C1 to output the log information received by the third port C3. The first port C1 transmits the received log information to the second input terminal A4 of the first selector 50. The first selector 50 selects the first output terminal A3 to output the log information received by the second input terminal A4 according to the first selection signal. The first output terminal A3 transmits the received log information to the first interface 30 through the voltage converter 80.

Figure 4:
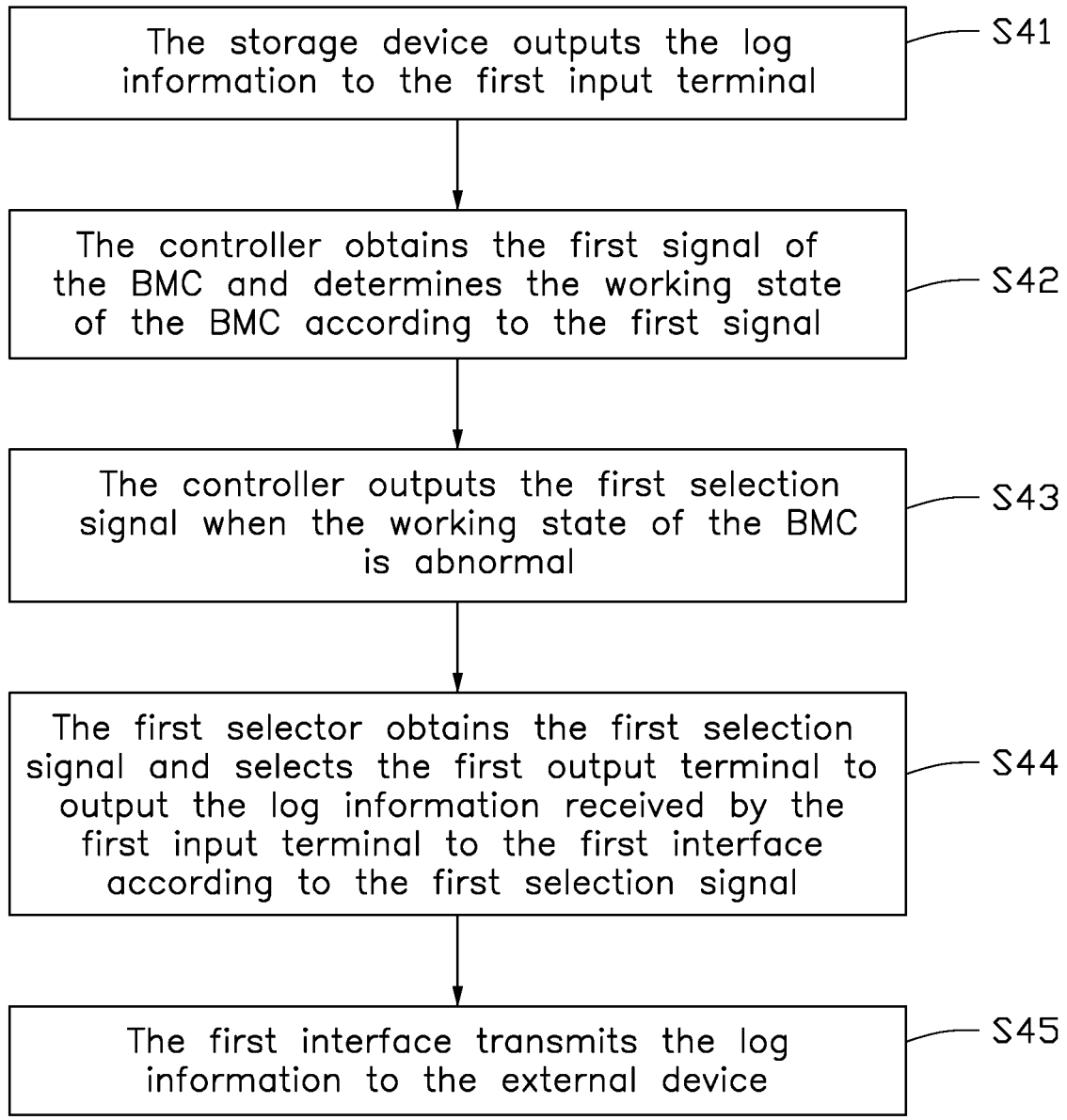
FIG. 4 is a flowchart of a log information obtaining method according to an embodiment of the present disclosure.

FIG. 4 illustrates a log information obtaining method in accordance with an embodiment of the present disclosure. The log information obtaining method is applied to the log information obtaining system 200 shown in FIG. 2 and FIG. 3.

The log information obtaining method includes the following steps:

At step S41, the storage device 10 outputs the log information to the first input terminal A2.

As shown in FIG. 3, the storage device 10 can transmit the log information to the first input terminal A2 through the UART interface 12.

At step S42, the controller 40 obtains the first signal of the BMC 20 and determines the working state of the BMC 20 according to the first signal.

It can be understood that the working state of the BMC 20 can be normal or abnormal.

At step S43, when the working state of the BMC 20 is abnormal, the controller 40 outputs the first selection signal.

At step S44, the first selector 50 obtains the first selection signal and selects the first output terminal A3 to output the log information received by the first input terminal A2 to the first interface 30 according to the first selection signal.

At step S45, the first interface 30 is used to transmit the received log information to the external device.

Figure 5:
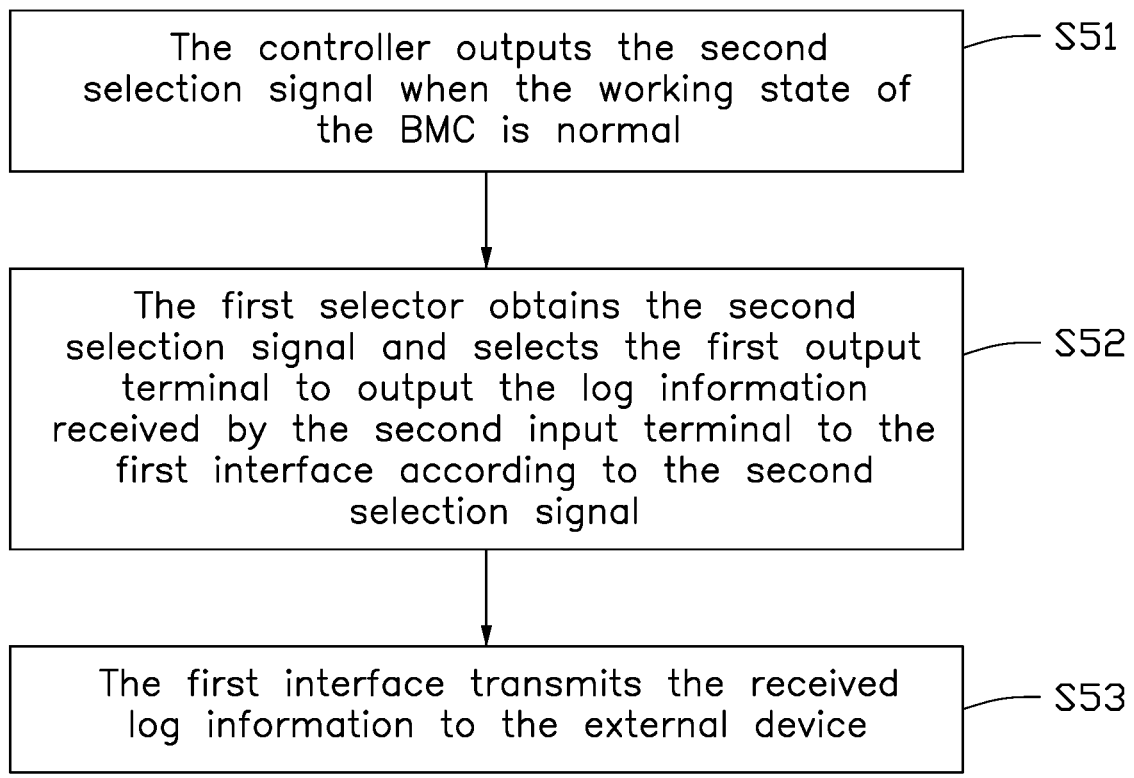
FIG. 5 is a flowchart of a log information obtaining method according to another embodiment of the present disclosure.

In other embodiments, the working state of the BMC 20 can be normal. Referring to FIG. 5, the log information obtaining method further includes the following steps:

At step S51, when the working state of the BMC 20 is normal, the controller 40 outputs the second selection signal.

At step S52, the first selector 50 obtains the second selection signal and selects the first output terminal A3 to output the log information received by the second input terminal A4 to the first interface 30 according to the second selection signal.

At step S53, the first interface 30 is used to transmit the received log information to the external device.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A log information obtaining system applied to an electronic device and comprising:
   a baseboard management controller (BMC);
   a storage device configured to store log information of the electronic device;
   a first interface electrically connected to an external device; and
   a controller configured to obtain a first signal of the BMC and determine working state of the BMC according to the first signal, the controller further configured to output a first selection signal when the working state of the BMC is abnormal;

a first selector comprising a first selection terminal, a first input terminal and a first output terminal, the first selection terminal electrically connected to the controller, the first input terminal configured to receive the log information transmitted by the storage device, the first output terminal electrically connected to the first interface, the first selector configured to select the first output terminal to output the log information received from the first input terminal to the external device according to the first selection signal;

a second selector, wherein the second selector comprises a first terminal, a second terminal and a third terminal, the first terminal is electrically connected to the controller, the second terminal is electrically connected to the storage device, the third terminal is electrically connected to the first input terminal, and the second selector is configured to select the third terminal to output the log information received from the second terminal to the first input terminal according to the first selection signal; wherein the controller is further configured to output a second selection signal when the working state of the BMC is normal;

wherein the second selector further comprises a fourth terminal, the BMC further comprises a third selector, the third selector comprises a first port and a second port, the first port is electrically connected to the second input terminal, and the second port is electrically connected to the fourth terminal, and the second selector is further configured select the fourth terminal to output the log information received by the second terminal to the BMC according to the second selection signal.

2. The log information obtaining system of claim 1, wherein the BMC is electrically connected to the storage device for obtaining the log information; the first selector further comprises a second input terminal, the second input terminal is electrically connected to the BMC; and the first selector is further configured to select the first output terminal to output the log information received by the second input terminal to the external device according to the second selection signal.

3. The log information obtaining system of claim 2, wherein the third selector further comprises a third port, the storage device is a central processing unit (CPU), the second terminal is electrically connected to an enhanced serial peripheral interface of the CPU, and the third port is electrically connected to a universal asynchronous transceiver transmission interface of the CPU.

4. The log information obtaining system of claim 3, further comprising a voltage converter, wherein the voltage converter is electrically connected between the first interface and the first output terminal.

5. The log information obtaining system of claim 4, wherein the voltage converter is a voltage conversion chip.

6. The log information obtaining system of claim 1, wherein the controller and the first selector are arranged on a complex programmable logic device (CPLD).

7. A log information obtaining system applied to an electronic device and comprising:
a baseboard management controller (BMC);
a storage device configured to store log information of the electronic device;
a first interface electrically connected to an external device; and a controller configured to obtain a first signal of the BMC and determine working state of the BMC according to the first signal, the controller further configured to output a first selection signal when the working state of the BMC is abnormal;

a first selector comprising a first selection terminal, a first input terminal and a first output terminal, the first selection terminal electrically connected to the controller, the first input terminal configured to receive the log information transmitted by the storage device, the first output terminal electrically connected to the first interface, the first selector configured to select the first output terminal to output the log information received from the first input terminal to the external device according to the first selection signal;

wherein the BMC is electrically connected to the storage device for obtaining the log information;

wherein the log information obtaining system comprises a second selector, wherein the second selector comprises a first terminal, a second terminal and a third terminal, the first terminal is electrically connected to the controller, the second terminal is electrically connected to the storage device, the third terminal is electrically connected to the first input terminal, and the second selector is configured to select the third terminal to output the log information received from the second terminal to the first input terminal according to the first selection signal; wherein the controller is further configured to output a second selection signal when the working state of the BMC is normal;

wherein the second selector further comprises a fourth terminal, the BMC further comprises a third selector, the third selector comprises a first port and a second port, the first port is electrically connected to the second input terminal, and the second port is electrically connected to the fourth terminal, and the second selector is further configured select the fourth terminal to output the log information received by the second terminal to the BMC according to the second selection signal.

8. The log information obtaining system of claim 7, wherein the first selector further comprises a second input terminal, the second input terminal is electrically connected to the BMC; and the first selector is further configured to select the first output terminal to output the log information received by the second input terminal to the external device according to the second selection signal.

9. The log information obtaining system of claim 8, wherein the third selector further comprises a third port, the storage device is a central processing unit (CPU), the second terminal is electrically connected to an enhanced serial peripheral interface of the CPU, and the third port is electrically connected to a universal asynchronous transceiver transmission interface of the CPU.

10. The log information obtaining system of claim 9, further comprising a voltage converter, wherein the voltage converter is electrically connected between the first interface and the first output terminal.

11. The log information obtaining system of claim 10, wherein the voltage converter is a voltage conversion chip.

12. The log information obtaining system of claim 7, wherein the controller and the first selector are arranged on a complex programmable logic device (CPLD).

13. A log information obtaining method applied to a log information obtaining system, the log information obtaining system comprising a storage device, a first interface, a baseboard management controller (BMC), a controller and a first selector, the controller electrically connected to the BMC, the first selector comprising a first selection terminal, a first input terminal and a first output terminal, the first selection terminal electrically connected to the controller, and the first input terminal electrically connected the storage device, the first output terminal electrically connected to the first interface, the log information obtaining method comprising:

the storage device configured to output log information to the first input terminal;

the controller configured to obtain a first signal of the BMC and determine working state of the BMC according to the first signal, the controller further configured to output a first selection signal when the working state of the BMC is abnormal;

the first selector configured to select the first output terminal to output the log information received from the first input terminal to the first interface according to the first selection signal; and the first interface configured to transmit the log information to an external device;

wherein the log information obtaining system comprises a second selector, wherein the second selector comprises a first terminal, a second terminal and a third terminal, the first terminal is electrically connected to the controller, the second terminal is electrically connected to the storage device, the third terminal is electrically connected to the first input terminal; wherein the controller is further configured to output a second selection signal when the working state of the BMC is normal;

wherein the second selector further comprises a fourth terminal, the BMC further comprises a third selector, the third selector comprises a first port and a second port, the first port is electrically connected to the second input terminal, and the second port is electrically connected to the fourth terminal;

wherein the log information obtaining method further comprises:

the second selector is configured to select the third terminal to output the log information received from the second terminal to the first input terminal according to the first selection signal; and the second selector is further configured select the fourth terminal to output the log information received by the second terminal to the BMC according to the second selection signal.

14. The log information obtaining method of claim 13, wherein the BMC is electrically connected to the storage device for obtaining the log information; the first selector further comprises a second input terminal, the second input terminal is electrically connected to the BMC; the controller outputs a second selection signal when the working state of the BMC is normal, the first selector obtains the second selection signal, and selects the first output terminal to output the log information received by the second input terminal to the first interface according to the second selection signal, the first interface transmits the log information to the external device.

\* \* \* \* \*